(12) United States Patent
Muthiah

(10) Patent No.: US 12,164,807 B2
(45) Date of Patent: Dec. 10, 2024

(54) SPECULATIVE COMMAND PROCESSING INTERFACE IN STORAGE SYSTEMS

(71) Applicant: Sandisk Technologies, Inc., Milpitas, CA (US)

(72) Inventor: Ramanathan Muthiah, Bangalore (IN)

(73) Assignee: Sandisk Technologies, Inc., Milpitas, CA (US)

(*) Notice: Subject to any disclaimer, the term of this patent is extended or adjusted under 35 U.S.C. 154(b) by 1 day.

(21) Appl. No.: 17/717,707

(22) Filed: Apr. 11, 2022

(65) Prior Publication Data

US 2023/0325117 A1    Oct. 12, 2023

(51) Int. Cl.
G06F 3/06 (2006.01)
G06F 9/30 (2018.01)
G06F 9/38 (2018.01)

(52) U.S. Cl.
CPC .......... *G06F 3/0659* (2013.01); *G06F 3/0607* (2013.01); *G06F 3/0656* (2013.01); *G06F 3/0679* (2013.01); *G06F 9/3005* (2013.01); *G06F 9/3842* (2013.01)

(58) Field of Classification Search
CPC .. G06F 16/10; G06F 16/1774; G06F 12/0813; G06F 12/0862; G06F 2212/507; G06F 12/0246; G06F 12/0817; G06F 12/082; G06F 12/084; G06F 12/0866; G06F 12/123; G06F 2212/1024; G06F 3/0613; G06F 3/0659; G06F 3/0676; G06F 9/3842; G06F 9/546; G06F 12/0831
See application file for complete search history.

(56) References Cited

U.S. PATENT DOCUMENTS

| 6,567,901 | B1 | 5/2003 | Neufeld |
| 7,600,078 | B1 * | 10/2009 | Cen ..................... G06F 12/0831 |
| | | | 711/138 |
| 10,725,835 | B2 | 7/2020 | Benisty |

* cited by examiner

*Primary Examiner* — Yong J Choe
(74) *Attorney, Agent, or Firm* — PATTERSON + SHERIDAN, LLP (57) ABSTRACT

Systems and methods are disclosed for providing speculative command processing. In certain embodiments, a data storage device includes a non-volatile memory, a buffer, and a controller configured to: receive one or more actual requests for data from one or more hosts, wherein an actual request is associated with data confirmed to be required by an application on a host; receive one or more speculative requests for data from the one or more hosts, wherein a speculative request is associated with data that has not been confirmed to be required by an application on a host; process the one or more actual requests prior to the one or more speculative requests; and in response to determining that resources are available after processing the one or more actual requests, perform preprocessing for the one or more speculative requests.

20 Claims, 9 Drawing Sheets

SPECULATIVE COMMAND PROCESSING INTERFACE IN STORAGE SYSTEMS

BACKGROUND

Field

The present disclosure relates to data storage systems. In particular, the present disclosure relates to processing speculative commands in data storage systems.

Description of Related Art

Hosts can request data from data storage systems/devices. In some cases, a host may request data that is a potential candidate for subsequent access by a user before the data is confirmed to be required, for example, by sending a speculative command for the data.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Storage Systems for Speculative Command Processing

A host may request various types of data from a storage system/device. For example, a host can send read commands or requests for data needed by one or more applications executing on the host. Many applications, especially gaming applications, can determine or predict the next set of data required to continue operating the applications. For instance, based on a user's potential next steps in a game, a gaming application can determine that subsequent data required is either candidate page 1 ("CP1") representing a level in the game or candidate page 2 ("CP2") representing another level in the game. The levels associated with CP1 and CP2 may represent different scenarios independent of the current level in the game. When an application determines candidate sets for subsequent data, in general, the application can request all of the candidate sets. For example, the gaming application can request both CP1 and CP2. In turn, the host can send data requests for CP1 and CP2 to the storage device. When the gaming application progresses, some scenarios may lead to loading of many candidate pages in advance. Logical data associated with the candidate pages on the storage device may be random or sequential.

However, requesting of all candidate sets of data by the host or the application can lead to host thrashing. For example, the host can send read requests for both candidate pages CP1 and CP2 to the storage device, although the host knows in advance that one of the candidate pages would be thrashed in the host cache. The host can receive data for CP1 and CP2 from the storage device, use data for either CP1 or CP2 based on the user's selection (e.g., CP1), and then thrash data for the page that is not needed (e.g., CP2). Accordingly, speculative nature of certain data requests in the host state machine or the application state machine may not be indicated or utilized when requesting data from the storage device. Such data thrashing can be more resource intensive, especially in a multi-host environment since the storage device may use resources for a host that may eventually thrash data, rather than for a host that needs data. Further, such large-scale thrashing can truncate overall storage quality of service (QoS) ability to scale up. On the other hand, a host issuing a command after determining the correct candidate page may lead to a delay in obtaining data from the storage device. For example, sending a request after determining the correct candidate page may be too late for the storage device to perform input/output (I/O) from flash memory quickly.

In addition to host thrashing, requesting of all candidate sets of data by the host or the application can lead to storage device thrashing. The storage device can also perform some speculative reads ahead of time, such as Read Look Ahead (RLA), for example, in a RLA buffer. RLA can work well for sequential data, which is generally the case for media streaming applications. For instance, if a movie is playing, based on the current access, the storage device can determine that the following logical address is likely the next candidate to be obtained. However, such technique may not work with gaming applications, where candidate pages may not be logically associated. In these cases, although the storage device can perform RLA, the obtained data may not be of use to the host.

In order to address these and other challenges, a storage system according to certain aspects can provide and process speculative commands or requests between hosts and storage systems/devices. A host and a storage device can process actual requests for data as well as speculative requests for data. Actual requests can be for data that has been confirmed to be needed by an application. Speculative requests can be for data that can potentially be needed by an application but has not been confirmed by the application. An application executing on a host can generate actual requests and speculative requests for data, and the host can send actual requests and speculative requests to a storage device. By using speculative requests, speculation is triggered by the host. The storage device can receive actual requests and speculative requests for data and prioritize actual requests over speculative requests. If resources are available after processing actual requests, the storage device can perform preprocessing for speculative requests such that data can be sent to the host more quickly and efficiently when the speculative requests are confirmed by the host. For example, preprocessing of speculative requests can include prefetching control data such as logical-to-physical (L2P) tables or pages, prefetching data into a cache, etc. The storage device may also perform device speculative processing that is internal to the storage device, such as RLA, prefetching data based on machine learning, etc. The storage device can implement machine learning based on actual requests and speculative requests to predict which subsequent data hosts are likely to request. The storage device performs preprocessing for speculative requests, but does not send prefetched data to the host until a speculative request is confirmed by the host. Accordingly, host-device communication links (e.g., I/O lanes) and network bandwidth are not committed for data that may be thrashed by the host.

In this way, the storage system as described herein can implement a speculative command interface between the host and the storage device in order to minimize or eliminate data thrashing after data is transferred to the host, which can lead to optimal use of host-device communication links. Storage device resources can also be optimally utilized in a multi-host environment. For instance, actual requests from multiple hosts can be prioritized over speculative requests from the multiple hosts, and data that is confirmed to be required by hosts can be transferred prior to data that is potentially required by hosts. Details relating to the storage system for processing speculative commands are provided below.

Figure 1:
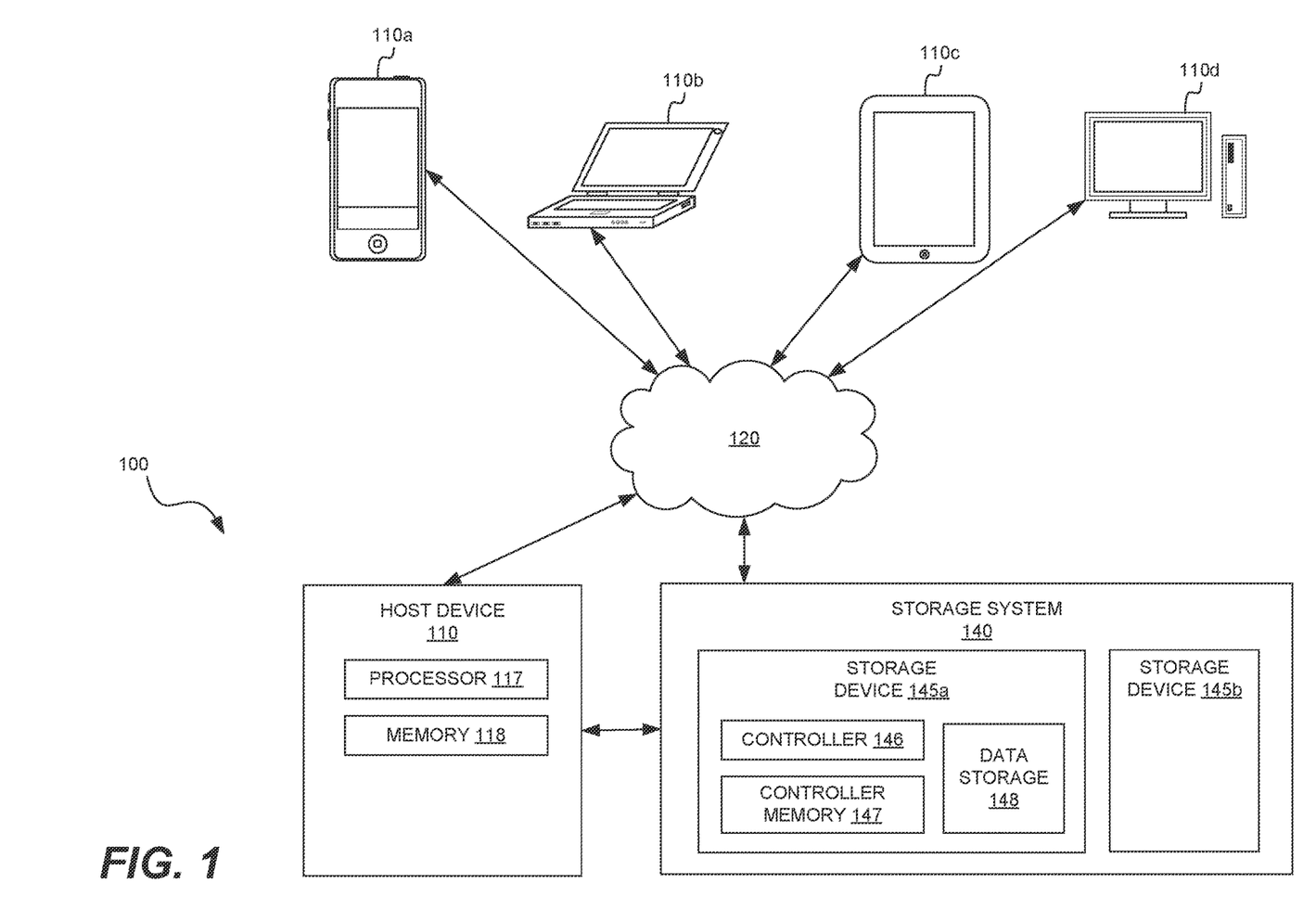
FIG. 1 illustrates an example system architecture for an example storage system relating to processing speculative commands, in accordance with one or more embodiments.

FIG. 1 illustrates an example system architecture 100 for an example storage system 140 relating to processing speculative commands, in accordance with one or more embodiments. The architecture 100 can include one or more user or client computing devices or hosts 110. A client computing device or host 110 can include a processor 117 and a memory 118. The one or more client computing devices 110 may be coupled to the storage system 140 directly or via a network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

The architecture 100 can also include the storage system 140 for processing speculative commands. The storage system 140 can include one or more storage devices 145. A storage device 145a can include a controller 146, a controller memory 147, and data storage 148 (e.g., non-volatile memory). A storage device 145b can also include similar components. The storage system 140 may store data and/or data objects that may be accessed by the client computing devices 110. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and random-access memory (RAM) technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

In some embodiments, a "host" can refer to a system or device from which data on a storage system or device is accessed or requested. For instance, a client computing device 110 can be a host. In some embodiments, a "device" can refer to a storage system or device from which data is obtained, for example, to provide to a host.

According to certain embodiments, the storage system 140 and/or the storage device(s) 145 can be configured to process speculative commands, as described herein. For illustrative purposes, processing of speculative commands is described in connection with a storage device 145. A host 110 can send actual requests or speculative requests for data to a storage device 145. The storage device 145 can receive actual requests or speculative requests from the host 110. The storage device 145 can prioritize processing actual requests over speculative requests. If resources are available after processing actual requests, the storage device 145 can perform preprocessing for speculative requests, such as converting logical addresses to physical addresses and prefetching data into a cache. If the host 110 converts a speculative request to an actual request, the storage device 145 can send prefetched data for the speculative request to the host 110, which can lead to increased speed for transferring data for the speculative request. By performing preprocessing for speculative requests but not committing communication links and network resources until the speculative requests are confirmed, the storage device 145 can utilize resources more efficiently and prioritize transferring data that is confirmed to be required to hosts over data that may be thrashed once received by the hosts. Details relating to processing speculative commands are described below, for example, in connection with FIGS. 2-7.

Figure 2:
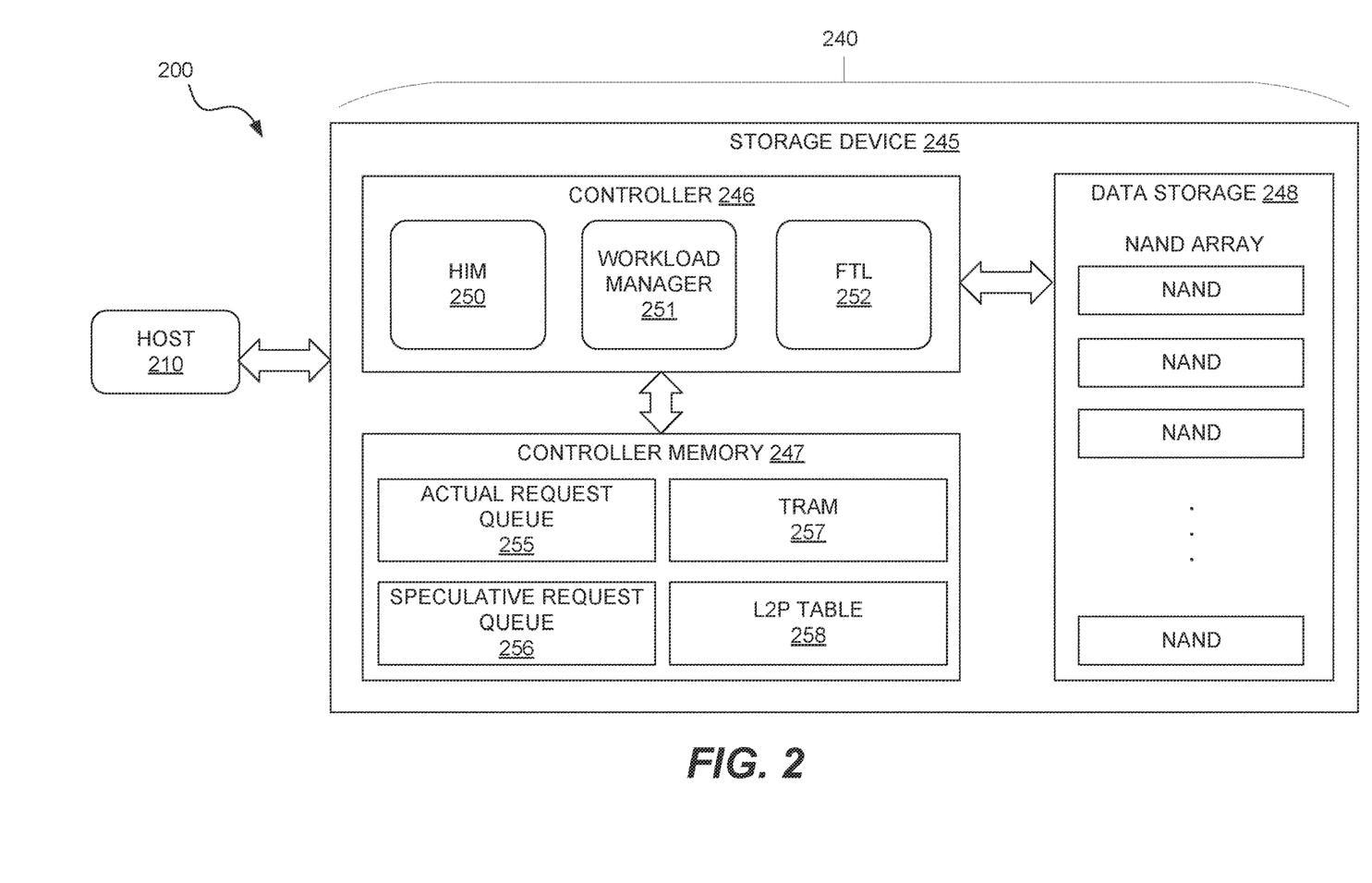
FIG. 2 is a block diagram illustrating an example storage device, in accordance with one or more embodiments.

FIG. 2 is a block diagram 200 illustrating an example storage device 245, in accordance with one or more embodiments. In some embodiments, components of FIG. 2 can be similar to components of FIG. 1 having similar names and/or reference numbers. For example, the storage device 245 can be similar to a storage device 145 in FIG. 1. Certain details relating to the block diagram 200 are described above in connection with FIG. 1.

The storage system 240 can include one or more storage devices 245. A storage device 245 can communicate with a host 210, such as a client computing device. The storage device 245 can include a controller 246 and data storage 248. As shown in FIG. 2, the storage device 245 is an SSD device and includes a NAND array. The controller 246 can include various components. In some embodiments, the controller 246 includes a host interface manager (HIM) 250, a workload manager 251, and a flash translation layer (FTL) 252. The HIM 250 can manage interfacing and communication between the host 210 and the storage device 245. Examples of the interface between the host 210 and the storage device 245 may include peripheral component interconnect express (PCIe), serial advanced technology attachment (SATA), non-volatile memory express (NVMe), etc. The HIM 250 can handle receiving of actual requests and speculative requests. In some embodiments, actual requests are received in an actual request queue 255, and speculative requests are received in a speculative request queue 256. The workload manager 251 can be configured to process the received actual requests and speculative requests based on priority and/or other factors. The FTL 252 may handle translation of logical block addresses (LBAs) from the host 210 to physical addresses on the data storage 248 as well as garbage collection. The storage device 245 can also include a controller memory 247. The controller memory 247 may include an actual request queue 255 and a speculative request queue 256. The controller memory 247 can also include a transfer RAM (TRAM) 257. The controller memory 247 may further include control data such as a L2P table 258. The controller 246 may include additional or fewer components, depending on the embodiment.

Figure 3A:
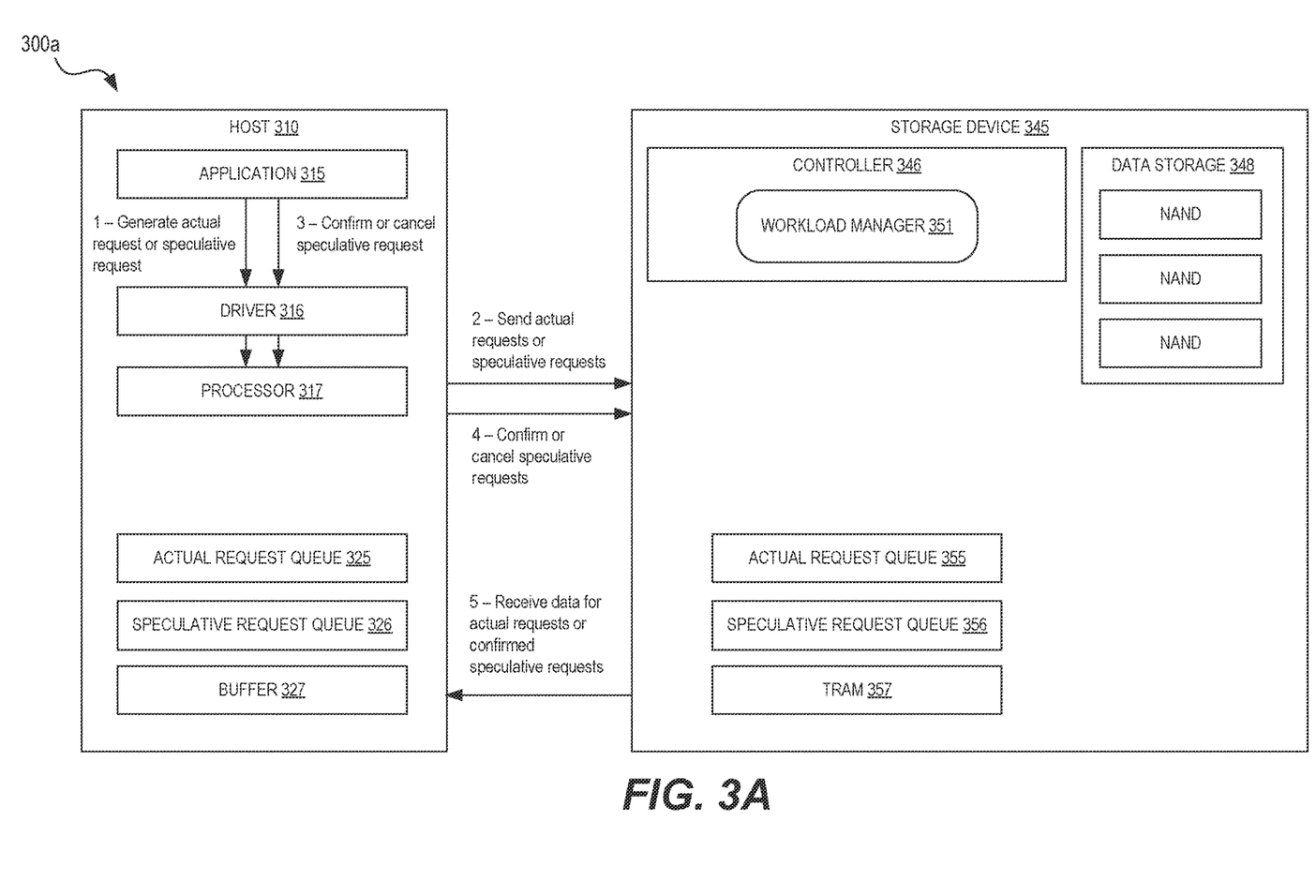
FIG. 3A illustrates a data flow diagram illustrating an example scenario relating to processing speculative commands in an example host and an example storage device, in accordance with one or more embodiments.

FIG. 3A illustrates a data flow diagram 300a illustrating an example scenario relating to processing speculative commands in an example host 310 and an example storage device 345. For instance, the data flow diagram 300a illustrates data flow blocks for the host 310. In some embodiments, components of FIG. 3A can be similar to components of FIGS. 1-2 having similar names and/or reference numbers. For example, the storage device 345 can be similar to a storage device 145, 245 in FIGS. 1-2. Certain details relating to the data flow diagram 300a are described above in connection with FIGS. 1-2. Depending on the embodiment, the data flow diagram 300a may include fewer or additional data flow blocks, and the data flow blocks may be performed in an order that is different from illustrated.

At data flow block 1, one or more applications 315 executing on the host 310 can generate an actual request for data or a speculative request for data. For example, an application 315 can be a gaming application. An application 315 can send an actual request for data that the application 315 determines is confirmed to be required. The application 315 can send a speculative request for data that the application 315 determines is potentially required. The host 310 can include a processor 317, and the processor 317 can receive data requests from one or more applications 315 and send the data requests to the storage device 345. The application 315 and/or the host 310 may refer to the application state machine and/or the host state machine in generating actual requests and speculative requests. In some embodiments, an actual request can be a typical read request, and a speculative request can be a special type of read request indicating that requested data is potentially required but not confirmed to be required. In other embodiments, both an actual request and a speculative request are typical read requests, with a flag or metadata indicating whether the read request is an actual request or a speculative request.

Actual requests can be placed in an actual request queue 325. Speculative requests can be placed in a speculative request queue 326. One or more command submission queues may be used to submit actual requests and speculative requests. In some embodiments, a submission queue can be created for actual requests, and another submission queue can be created for speculative requests. In other embodiments, one submission queue can be created for both actual requests and speculative requests, and a flag or metadata can indicate whether a particular command is an actual request or a speculative request.

In some embodiments, the host 310 includes a driver 316, and the driver 316 can interface with and consolidate data requests from multiple applications 315. The driver 316 can group all actual requests from multiple applications 315 and place them in the actual request queue 325 and group all speculative requests from multiple applications 315 and place them in the speculative request queue 326.

In an example, the application 315 can be a gaming application, and the gaming application 315 can predict which data may be needed next in a game based on the current application state and the user's potential next steps in the game. For instance, at the current level, the user may be able to proceed to one of three different levels. Accordingly, the application 315 determines that the application 315 subsequently needs one of candidate pages CP1, CP2, and CP3, each representing one of the three levels, respectively. The application 315 currently does not have knowledge of which level will be needed in the game. The application 315 generates a speculative request for each candidate page CP1, CP2, and CP3. The host 310 then sends the speculative requests for CP1, CP2, and CP3 to the storage device 345.

At data flow block 2, the host 310 can send actual requests or speculative requests to the storage device 345. For example, the processor 317 can send actual requests and speculative requests from applications 315 to the storage device 345. In some embodiments, the driver 316 consolidates actual requests and speculative requests from the applications 315 and places them in appropriate queues. By using speculative requests, the host 310 and/or applications 315 can feed forward the next set of possible requests in advance to the storage device 345 without committing to I/O resources at the time of request. The storage device 345 can perform preprocessing for a speculative request, but does not transfer any data to the host 310 until data for the speculative request is confirmed. If typical data requests (e.g., actual requests) are used instead of speculative requests, I/O resources may be committed for data that is not confirmed to be required, which can lead to unnecessary network traffic and lane traffic. In addition, thrashed traffic and bandwidth may divert resources from confirmed requests of another host 310 in a multi-host environment. Speculative requests represent possible requests since the host 310 and/or the application 315 may not be aware of the next state machine. Accordingly, speculative requests may have lower priority than actual requests.

At data flow block 3, the application 315 can confirm or cancel a speculative request. For instance, if the application 315 can determine that data for which a speculative request was sent is confirmed to be required, for example, based on the application state machine, the application 315 can confirm the speculative request. Similarly, if the application 315 determines that data for which a speculative request was sent is confirmed to be not required, for example, based on the application state machine, the application 315 can cancel the speculative request. In the example of the gaming application 315, the application 315 may become aware based on the user's actions that candidate page CP2 will be selected as the next level in the game. The application 315 can confirm the speculative request for CP2 and cancel the speculative requests for CP1 and CP3. As an example, a speculative request can be confirmed by converting the speculative request to an actual request. The converted speculative request may be submitted through the actual request queue 325. In certain embodiments, the converted speculative request may be tagged with the corresponding speculative request such that the storage device 345 can determine which speculative request is associated with the converted speculative request. In other embodiments, the storage device 345 can determine which speculative request is associated with the converted speculative request. As another example, a speculative request can be confirmed by updating a flag or metadata associated with a speculative request to indicate that the request is now an actual request. A speculative request can be canceled by converting the speculative request to a thrash request. A thrash request may be a command abort request, for example, over admin or I/O submission queues.

At data flow block 4, the host 310 can confirm or cancel speculative requests to the storage device 345. If an application 315 confirms or cancels a speculative request, the host 310 can notify the storage device 345. As discussed above, a speculative request can be converted to an actual request. As another example, a flag or metadata associated with a speculative request can be updated to indicate that the request is now an actual request.

At data flow block 5, the host 310 can receive data for actual requests or confirmed speculative requests from the storage device 345. The received data can be stored in a buffer 327. The host 310 can provide the received data for the actual requests or confirmed speculative requests to corresponding applications 315. If the received data for the actual requests or confirmed speculative requests is no longer needed, the host 310 can thrash the received data.

In some embodiments, a gaming processor or accelerator in the host 310 is directly connected or coupled to the storage device 345, and utilizing actual requests and speculative requests can be helpful since the gaming processor or accelerator can queue actual requests and speculative requests and the storage device 345 can manage the response time for the actual requests and speculative requests. For instance, managing the response time include prioritizing actual requests over speculative requests and further prioritizing speculative requests over device determined read look ahead data.

Speculation can provide a command heads-up that may or may not materialize. In general, in a typical storage device not using speculative requests, if the host 310 requests any new logical data that is not associated with current read/write requests in the submission queue, the storage device may not be able to predetermine or efficiently process such requests. For instance, device side speculation methods such as RLA or control page determination for random performance are based on history or the current logical address being serviced. By utilizing speculative requests, the host 310 can indicate to the storage device 345 which requests are for confirmed data and which requests are for speculative data, enabling the storage device 345 to more effectively handle requests for speculative data.

Figure 3B:
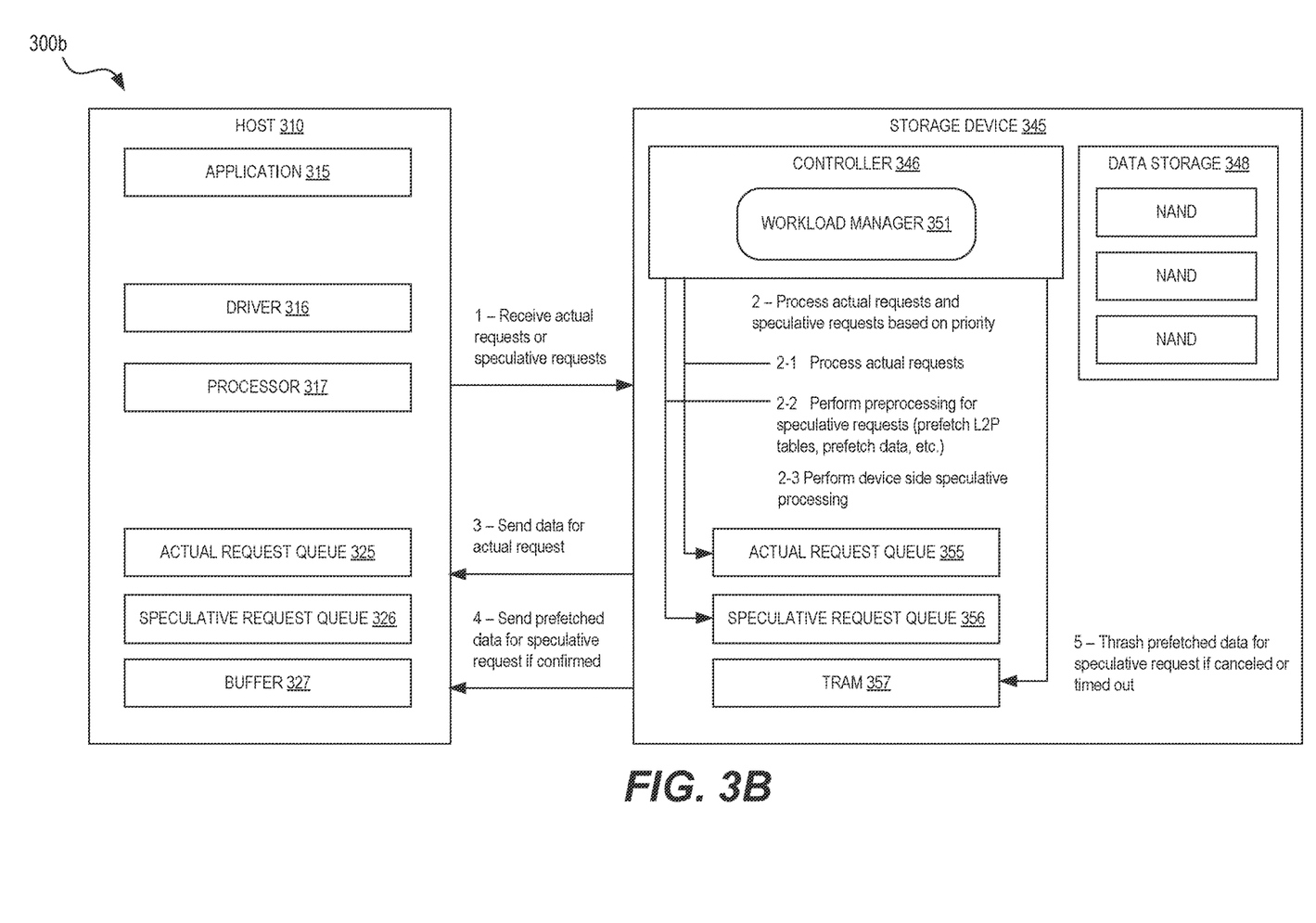
FIG. 3B illustrates a data flow diagram illustrating an example scenario relating to processing speculative commands in an example host and an example storage device, in accordance with one or more embodiments.

FIG. 3B illustrates a data flow diagram 300b illustrating an example scenario relating to processing speculative commands in an example host 310 and an example storage device 345. For instance, the data flow diagram 300b illustrates data flow blocks for the storage device 345. In some embodiments, components of FIG. 3B can be similar to components of FIGS. 1-3A having similar names and/or reference numbers. For example, the storage device 345 can be similar to a storage device 145, 245, 345 in FIGS. 1-3A. Certain details relating to the data flow diagram 300b are described above in connection with FIGS. 1-3A. Depending on the embodiment, the data flow diagram 300b may include fewer or additional data flow blocks, and the data flow blocks may be performed in an order that is different from illustrated.

At data flow block 1, the storage device 345 can receive actual requests and speculative requests for data from one or more hosts 310. In some embodiments, the storage device 345 can have a front-end module and a back-end module. For instance, the front-end module receives speculative requests, and the back-end module performs preprocessing for speculative requests to provide better response times for the speculative requests. Actual requests are stored in an actual request queue 355. Speculative requests are stored in a speculative request queue 356. In some embodiments, one command submission queue can be used for both actual requests and speculative requests, and a flag or metadata can indicate whether a request is an actual request or a speculative request.

At data flow block 2, the storage device 345 can process actual requests and speculative requests based on priority and/or other factors. For example, the workload manager 351 can prioritize data requests based on the type of request. The workload manager 351 can prioritize actual requests over speculative requests. Since speculation using speculative requests is triggered by the host 310, the storage device 345 can prioritize speculative requests from the hosts 310 over device side speculation methods, such as RLA. For instance, device side speculation methods may include any speculative processing that the storage device 345 uses internally to improve prediction of prefetching of data. The workload manager 351 can rank the order in which different types of requests or tasks are performed.

At data flow block 2-1, the storage device 345 can process actual requests. The storage device 345 may receive actual requests from multiple hosts 310. The storage device 345 can process actual requests from the multiple hosts 310 prior to processing speculative requests from the multiple hosts 310. The storage device 345 can process the actual requests and perform typical background tasks, such as garbage collection, etc. The storage device 345 can obtain the L2P table and/or pages for data associated with an actual request to convert logical addresses for the data to corresponding physical addresses, fetch the data from the physical addresses, and load the fetched data into the TRAM 357 to transfer to the host 310. Actual requests that have been converted from speculative requests can also be processed prior to other pending speculative requests.

At data flow block 2-2, the storage device 345 can perform preprocessing for speculative requests. If more resources are available after processing actual requests, the storage device 345 can perform preprocessing for speculative requests. Preprocessing for speculative requests can be helpful, especially for data requests associated with logical data that is not sequential, as in the context of a gaming application. Preprocessing for speculative requests can include prefetching L2P tables and/or pages, converting logical addresses for requested data to physical addresses, and prefetching the requested data. For instance, physical addresses for data associated with a speculative request can be obtained by prefetching L2P pages for corresponding logical addresses from the data storage 348 (e.g., NAND). I/O prefetch for data residing at the physical addresses on the data storage 348 (e.g., NAND) can be triggered. In the examples of FIGS. 3A and 3B, the data storage 348 is a NAND array. The amount of data that is prefetched may be determined based on cache availability. The storage device 345 can perform error correction for the data, such as low-density parity-check (LDPC) decoding. The prefetched data from the data storage 348 can be stored in the TRAM 357. However, the storage device 345 waits to transfer the prefetched data to the host 310 until the speculative request is confirmed by the host 310.

At data flow block 2-3, the storage device 345 can perform device side speculative processing. If more resources are available after performing preprocessing for speculative requests, the storage device 345 can perform various device side speculative processing techniques. Device side speculative processing techniques may include RLA, machine learning, etc. As an example, the storage device 345 can perform RLA for the current logical address being processed, for example, for next sequential data. The storage device 345 may implement machine learning to predict which subsequent data to prefetch for random or nonsequential logical data. For instance, the storage device 345 can determine data access patterns for one or more hosts 310 relating to random or nonsequential logical data. Machine learning can be based on actual requests. Machine learning can also be based on speculative requests. Accordingly, a storage device 345 that supports speculative requests can have another type of input for machine learning relating to host data access patterns.

In some embodiments, the workload manager 351 can prioritize data requests as follows: converted speculative requests, actual requests and background processing, speculative requests, and device side speculation processing. In certain cases, when a host 310 converts a speculative request to an actual request, the storage device 345 may treat the converted speculative request as an urgent priority request to make up for the time in the speculative request queue 356, if any. Therefore, converted speculative requests may be prioritized over other actual requests. Such urgent priority request treatment can depend on system design, and the storage device 345 may not utilize such feature if overhead is involved. The workload manager 351 then can process actual requests as indicated by data flow block 2-1, process speculative requests as indicated by data flow block 2-2, and perform device side speculation as indicated by data flow block 2-3.

At data flow block 3, the storage device 345 can send data for an actual request. For example, after the workload manager 351 processes an actual request at data flow block 2-1, the storage device 345 can transfer the data for the actual request to the host 310. As discussed above, the storage device 345 can obtain the L2P table and/or pages for data associated with the actual request to determine the physical addresses corresponding to logical addresses for the data, fetch the data from the physical addresses, and load the fetched data into the TRAM 357 to transfer to the host 310. As described above, actual requests that have been converted from speculative requests may also be processed along with other actual requests before processing pending speculative requests. In certain embodiments, actual requests that have been converted from speculative requests have higher priority than other actual requests since a delay may have resulted while these requests were in the speculative request queue 356.

At data flow block 4, the storage device 345 can send prefetched data for a speculative request if the speculative request is confirmed by the host 310 and/or the application 315. After the workload manager 351 performs preprocessing for a speculative request at data flow block 2-2, the storage device 345 can transfer the data for the speculative request to the host 310 if the data for the speculative request is confirmed to be required. For instance, when the requesting application 315 for the speculative request confirms that data associated with the speculative request is required, the host 310 can confirm the speculative request by converting the speculative request to an actual request. The converted speculative request can be resubmitted through the actual request queue 355. In some embodiments, the converted speculative request can be tagged with the speculative request associated with the converted speculative request such that the storage device 345 can identify the corresponding speculative request. In other embodiments, the storage device 345 determines to which speculative request the converted speculative request is related. Converted speculative requests may be processed before other pending speculative requests. Preprocessing for the speculative request may have been performed, and prefetched data for the speculative request may be loaded in the TRAM 357. The storage device 345 can send the prefetched data in the TRAM 357 to the host 310, and the host 310 can send the data to the requesting application 315. The amount of data that is prefetched in the TRAM 357 can be based on cache availability. In this way, I/O resources between the host 310 and the storage device 345 are not committed for speculative requests until the speculative requests are confirmed by the host 310 and/or the application 315, thereby reducing traffic for data that may be thrashed after transfer to the host 310.

At data flow block 5, the storage device 345 can thrash prefetched data for a speculative request if the speculative request is canceled by the host 310 and/or the application 315 or is timed out. When the application 315 becomes aware that certain data that the application 315 requested through a speculative request is not needed, the application 315 can cancel the speculative request. The host 310 can notify the storage device 345, for example, by sending a command abort. The storage device 345 can abort processing the speculative request, thrash any prefetched data for the speculative request, and release any resources associated with the speculative request. The canceled speculative request can be removed from the speculative request queue 356. Thus, resources utilized for a canceled speculative request can be limited to device resources, and communication links and network resources are not allocated to canceled speculative requests. In some cases, the host 310 may not notify the storage device 345 that the speculative request has been confirmed or that the speculative request has been canceled within a period of time. In such cases, the speculative request can time out, and the storage device 345 can treat the speculative request as canceled. The storage device 345 can thrash any prefetched data and release any resources associated with the speculative request. Accordingly, the storage device 345 can implement request-based thrashing for canceled requests and time-based thrashing for timed out requests.

In some embodiments, the storage device 345 can process actual requests and speculative requests in parallel for hardware efficiency, for example, in terms of NAND memory usage and flash channel usage. For instance, the L2P table for an actual request and the L2P table for a speculative request may be fetched simultaneously from Die 0 and Die 1, respectively. Similarly, I/O data may also be fetched in parallel for optimal retrieval. Thus, hardware efficiency can be implemented with respect to processing actual requests and speculative requests.

In this manner, a storage system for providing speculative requests between a host and a storage device can enable the storage device to utilize device and network resources more optimally in processing requests for data that is not confirmed to be required by the host and/or an application executing on the host. The storage device can prioritize actual requests over speculative requests, and perform preprocessing for speculative requests, but hold off on transferring any prefetched data for the speculative requests to the host until the data is confirmed to be required by the host and/or the application. Thus, the storage device can reduce committing host-device communication links and network resources for data that may be thrashed after transfer to the host. The storage device can provide power efficiency since unnecessary traffic between the host and the device can be reduced. The speculative command interface can be helpful for applications that tend to request nonsequential or random logical data, as in the case of a gaming application. The speculative command interface can also be helpful in a multi-host environment, where many requests may be received for data that is not confirmed to be required. In such case, use of speculative requests can indicate to the storage device which requests have priority and lead to faster response times.

Figure 4:
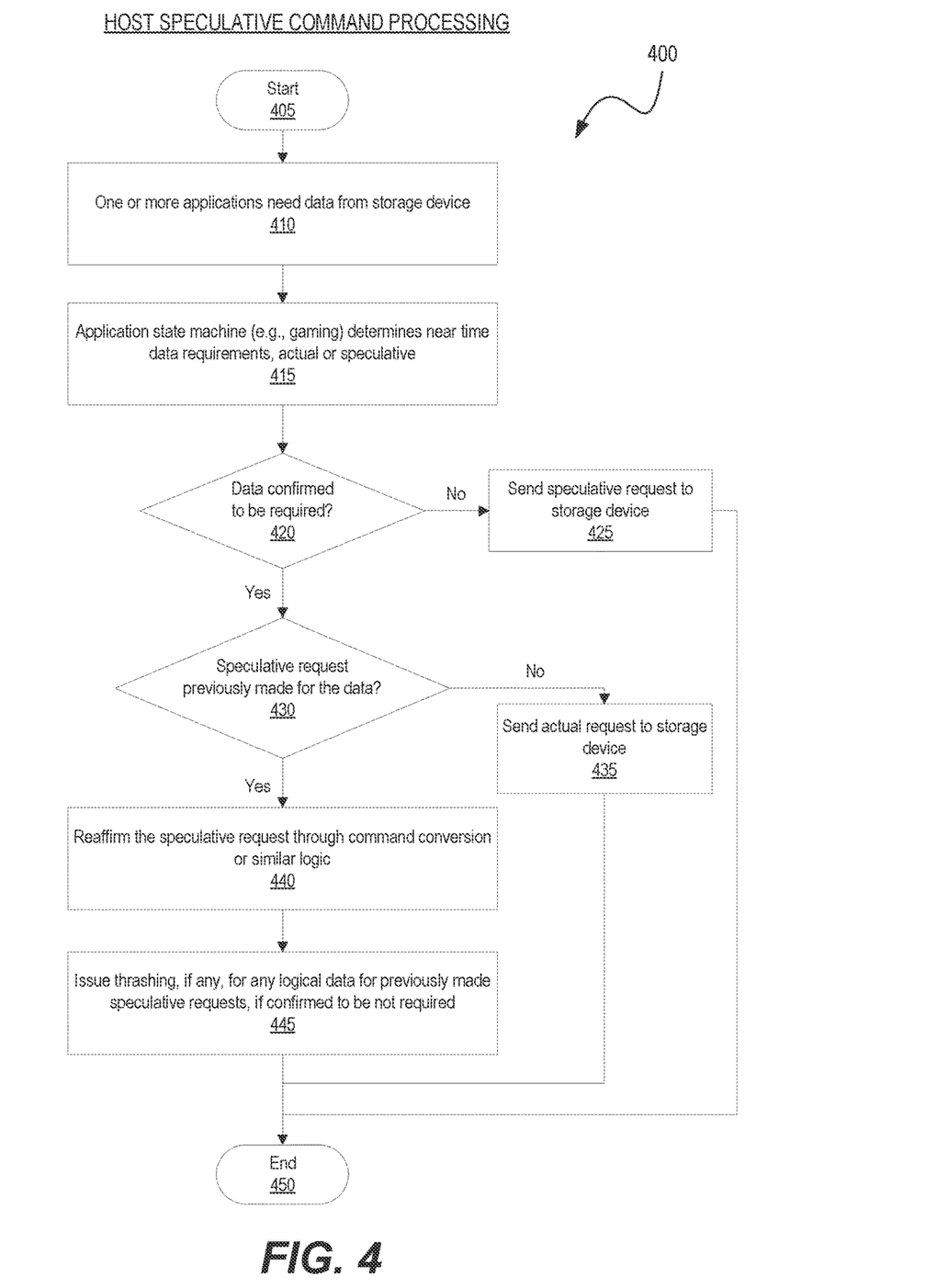
FIG. 4 illustrates a workflow process for processing speculative commands on a host, in accordance with one or more embodiments.

FIG. 4 illustrates a workflow process 400 for processing speculative commands on a host, in accordance with one or more embodiments. For example, the process 400 may be performed by a processor of a host, such as a host 110 in FIG. 1 or a host 310 in FIGS. 3A-3B. For illustrative purposes, the process 400 is explained below in connection with the host 310 in FIGS. 3A-3B. Certain details relating to the process 400 are explained in more detail with respect to FIGS. 1-3B. Depending on the embodiment, the process 400 may include fewer or additional blocks, and the blocks may be performed in an order that is different from illustrated.

The process 400 starts at block 405. At block 410, one or more applications 315 may need data from a storage device 345. At block 415, an application state machine for an application 315 can determine near time data requirements, which can be actual or speculative. At block 420, if data is not confirmed to be required, the host 310 can send a speculative request to the storage device 345, at block 425. At block 420, if data is confirmed to be required, the host 310 can determine whether a speculative request was previously made for the data, at block 430. At block 430, if a speculative request was not previously made for the data, the host 310 can send an actual request to the storage device 345, at block 435. For example, an actual request can be a typical read request. At block 430, if a speculative request was previously made for the data, the host 310 can reaffirm the speculative request through command conversion or similar logic, at block 440. At block 445, the host 310 can issue thrashing for any logical data for previously made speculative requests, if confirmed to be not required. The process 400 ends at block 450.

Figure 5:
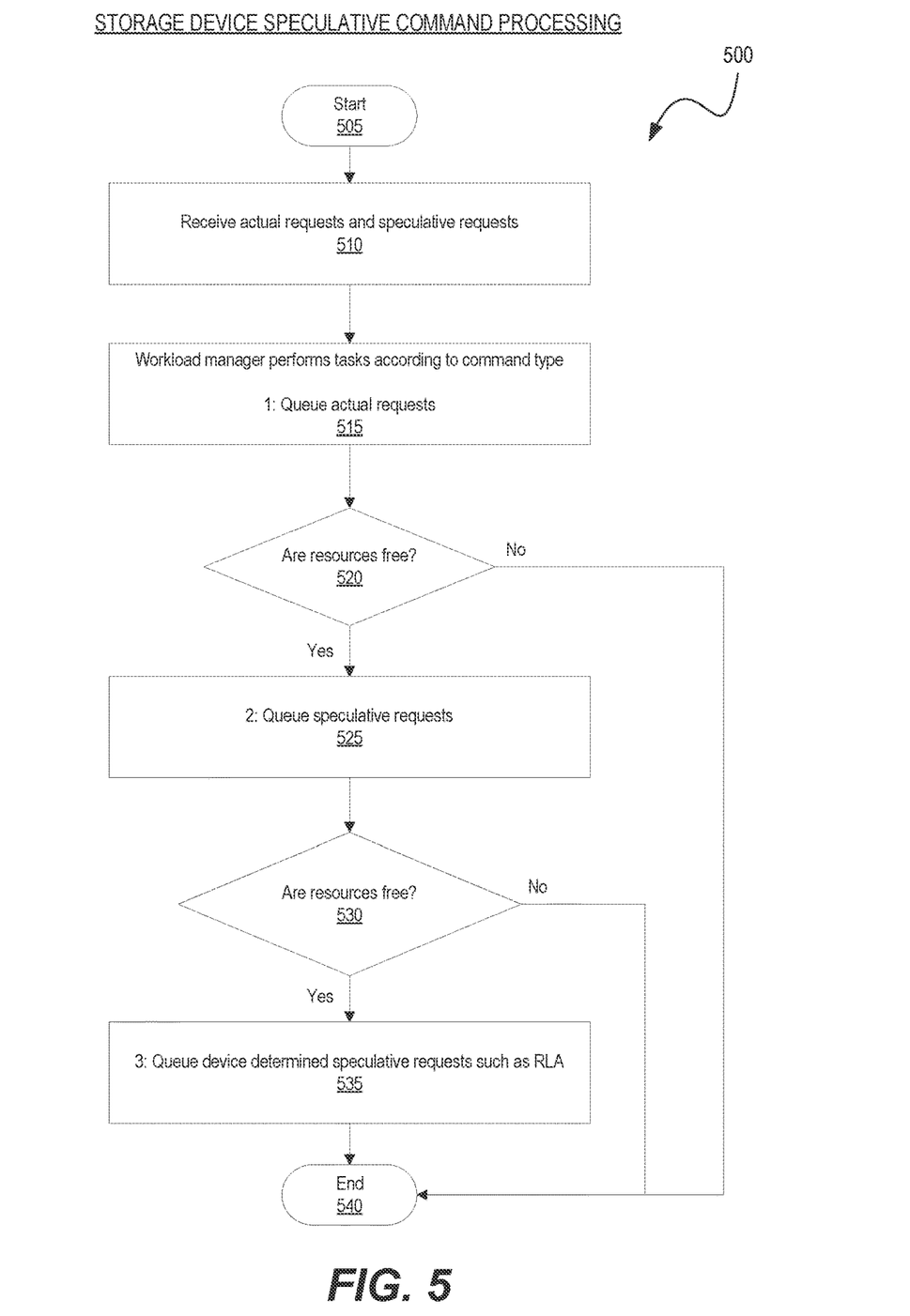
FIG. 5 illustrates a workflow process for processing speculative commands on a storage device, in accordance with one or more embodiments.

FIG. 5 illustrates a workflow process 500 for processing speculative commands on a storage device, in accordance with one or more embodiments. For example, the process 500 may be performed by a controller of a storage system or a storage device, such as a storage system 140 or a storage device 145 in FIG. 1, or a storage device 345 in FIGS. 3A-3B. For illustrative purposes, the process 500 is explained below in connection with the storage device 345 in FIGS. 3A-3B. Certain details relating to the process 500 are explained in more detail with respect to FIGS. 1-4. Depending on the embodiment, the process 500 may include fewer or additional blocks, and the blocks may be performed in an order that is different from illustrated.

The process 500 starts at block 505. At block 510, the storage device 345 can receive actual requests and speculative requests. At block 515, the workload manager 351 can perform tasks according to command type. First, the workload manager 351 can queue actual requests to process. At block 520, if resources are free after processing actual requests, the workload manager 351 can queue speculative requests to process, at block 525. At block 520, if resources are not free after processing actual requests, the process 500 ends at block 540. At block 530, if resources are free after processing speculative requests, the workload manager 351 can queue device determined speculative requests such as RLA, at block 535. At block 525, if resources are not free after processing speculative requests, the process 500 ends at block 540.

Figure 6:
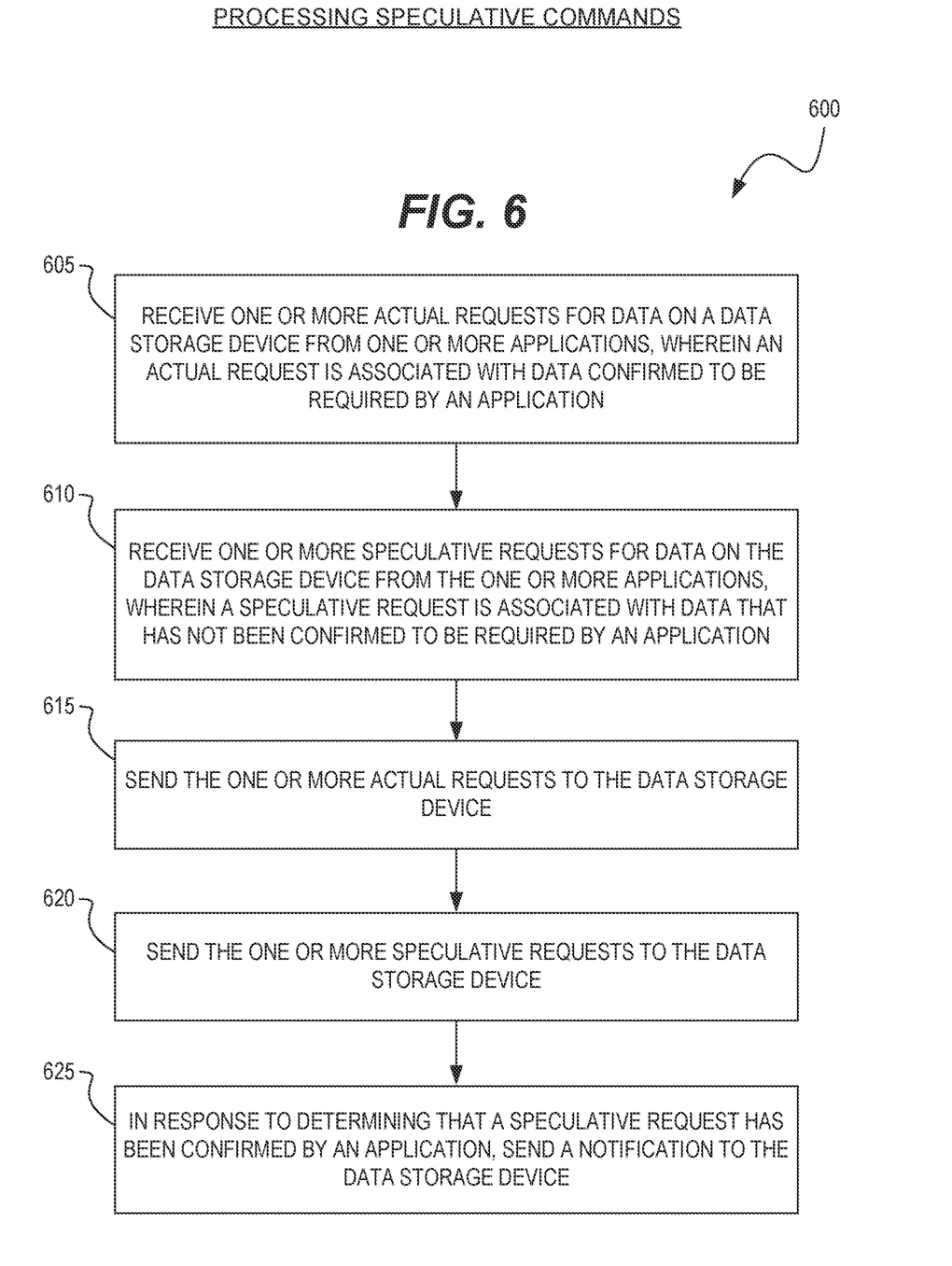
FIG. 6 illustrates a workflow process for processing speculative commands on a host, in accordance with one or more embodiments.

FIG. 6 illustrates a workflow process 600 for processing speculative commands on a host, in accordance with one or more embodiments. For example, the workflow process 600 may be performed by a processor of a host, such as a host 110 in FIG. 1 or a host 310 in FIGS. 3A-3B. For illustrative purposes, the process 600 is explained below in connection with the host 310 and the storage device 345 in FIGS. 3A-3B. Certain details relating to the process 600 are explained in more detail with respect to FIGS. 1-5. Depending on the embodiment, the process 600 may include fewer or additional blocks, and the blocks may be performed in an order that is different from illustrated.

At block 605, the host 310 can receive one or more actual requests for data on a data storage device 345 from one or more applications 315, wherein an actual request is associated with data confirmed to be required by an application 315. The host 310 can include a memory and a processor 317.

At block 610, the host 310 can receive one or more speculative requests for data on the data storage device 345 from the one or more applications, wherein a speculative request is associated with data that has not been confirmed to be required by an application 315. In some embodiments, a plurality of speculative requests from an application 315 on the host 310 are associated with logical data that is not sequential to each other. In certain embodiments, the one or more actual requests and the one or more speculative requests are stored in separate queues. In other embodiments, the one or more actual requests and the one or more speculative requests are stored in the same queue, and each request includes a flag or metadata indicating whether the request is an actual request or a speculative request. In some embodiments, the host 310 includes a driver 316 configured to interface with the one or more applications 315 and to consolidate the one or more actual requests and the one or more speculative requests.

At block 615, the host 310 can send the one or more actual requests to the data storage device 345. At block 620, the host 310 can send the one or more speculative requests to the data storage device 345.

At block 625, the host 310 can, in response to determining that a speculative request has been confirmed by an application 315, send a notification to the data storage device 345. For example, a speculative request can be converted to an actual request in response to the speculative request being confirmed by the application 315. In some embodiments, the host can 310 can, in response to determining that a speculative request has been canceled by an application 315, send a notification to the data storage device 345. The host 310 can receive data for an actual request or a speculative request that has been confirmed from the storage device 345.

Figure 7:
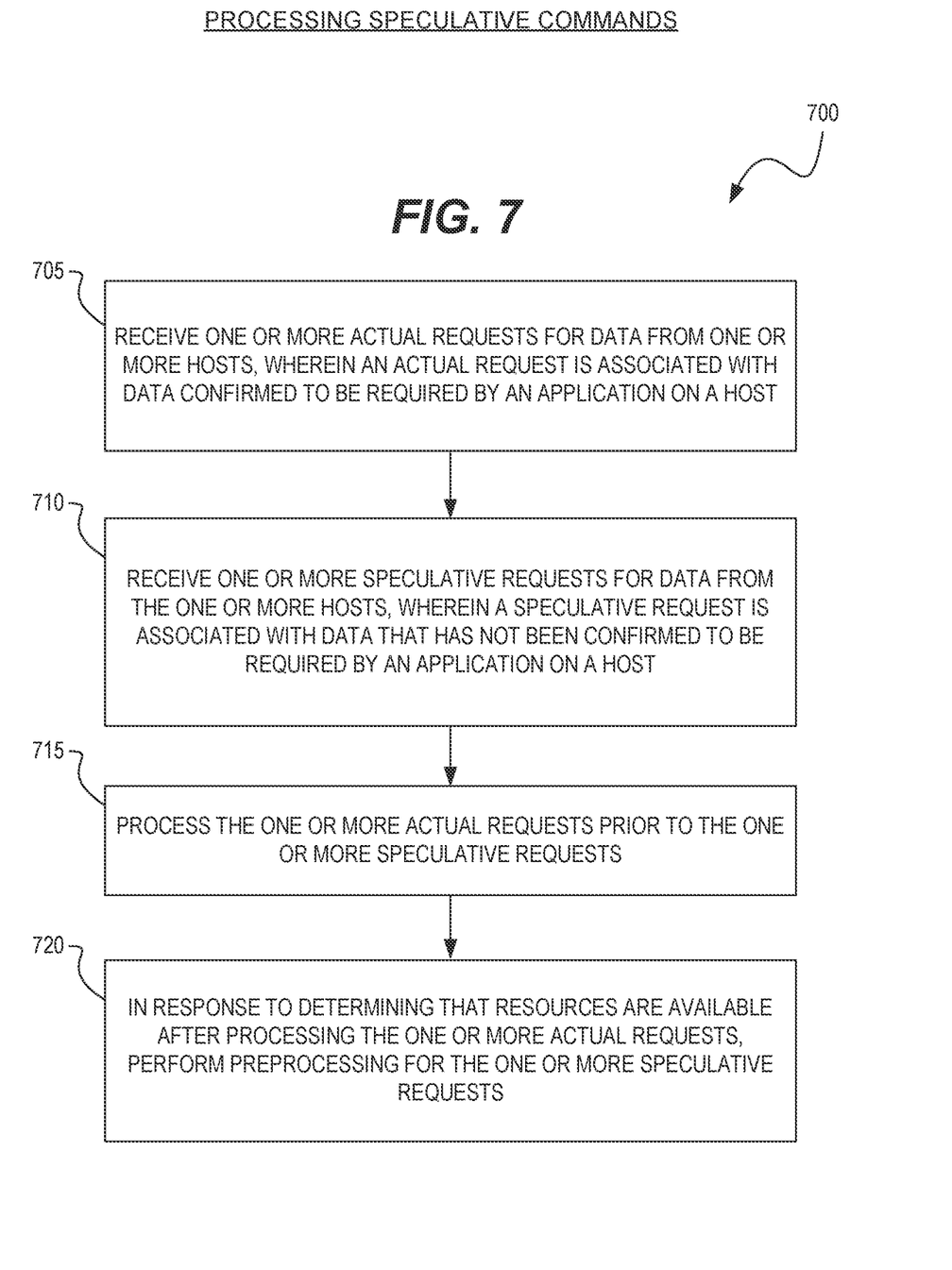
FIG. 7 illustrates a workflow process for processing speculative commands on a storage device, in accordance with one or more embodiments.

FIG. 7 illustrates a workflow process 700 for processing speculative commands on a storage device, in accordance with one or more embodiments. For example, the workflow process 700 may be performed by a controller of a storage system or a storage device, such as a storage system 140 or a storage device 145 in FIG. 1, a storage device 245 in FIG. 2, or a storage device 345 in FIGS. 3A-3B. For illustrative purposes, the process 700 is explained below in connection with the host 310 and the storage device 345 in FIGS. 3A-B. Certain details relating to the process 700 are explained in more detail with respect to FIGS. 1-6. Depending on the embodiment, the process 700 may include fewer or additional blocks, and the blocks may be performed in an order that is different from illustrated.

At block 705, the storage device 345 can receive one or more actual requests for data from one or more hosts 310, wherein an actual request is associated with data confirmed to be required by an application 315 on a host 310. The storage device 345 can include a non-volatile memory (e.g., data storage 348), a buffer (e.g., TRAM 357), and a controller 346.

At block 710, the storage device 345 can receive one or more speculative requests for data from the one or more hosts 310, wherein a speculative request is associated with data that has not been confirmed to be required by an application 315 on a host 310. In some embodiments, a plurality of speculative requests from an application 315 on a host 310 are associated with logical data that is not sequential to each other. In certain embodiments, the one or more actual requests and the one or more speculative requests are stored in separate queues. In other embodiments, the one or more actual requests and the one or more speculative requests are stored in the same queue, and each request includes a flag or metadata indicating whether the request is an actual request or a speculative request.

At block 715, the storage device 345 can process the one or more actual requests prior to the one or more speculative requests.

At block 720, the storage device 345 can, in response to determining that resources are available after processing the one or more actual requests, perform preprocessing for the one or more speculative requests. In certain embodiments, the performing preprocessing for the one or more speculative requests can include performing prefetching for data associated with a first speculative request from the non-volatile memory and loading the prefetched data into the buffer (e.g., TRAM 357). The performing preprocessing for the one or more speculative requests can further include obtaining a L2P table or page for relating to logical addresses for the data associated with the first speculative request, and converting the logical addresses to physical addresses based on the L2P table or page.

In some embodiments, the storage device 345 can, in response to determining that resources are available after the performing preprocessing for the one or more speculative requests, perform one or more data storage device speculative techniques. The one or more data storage device speculative techniques may include one or more of: read look ahead (RLA) or machine learning.

In certain embodiments, the storage device 345 can rank the one or more actual requests, the one or more speculative requests, and the one or more data storage device speculative techniques based on a type of request.

In some embodiments, the storage device 345 can receive a notification from a host 310 associated with the first speculative request that the first speculative request has been confirmed by a corresponding application 315, and send the prefetched data in the buffer to the host 310. The first speculative request may be converted to an actual request in response to the first speculative request being confirmed by the corresponding application 315.

In certain embodiments, the storage device 345 can receive a notification from a host associated with the first speculative request that the first speculative request has been canceled by a corresponding application, and thrash the prefetched data in the buffer. In some embodiments, the storage device 345 can determine that the first speculative request has been not been confirmed by a corresponding application within a specified period of time, and thrash the prefetched data in the buffer.

Figure 8:
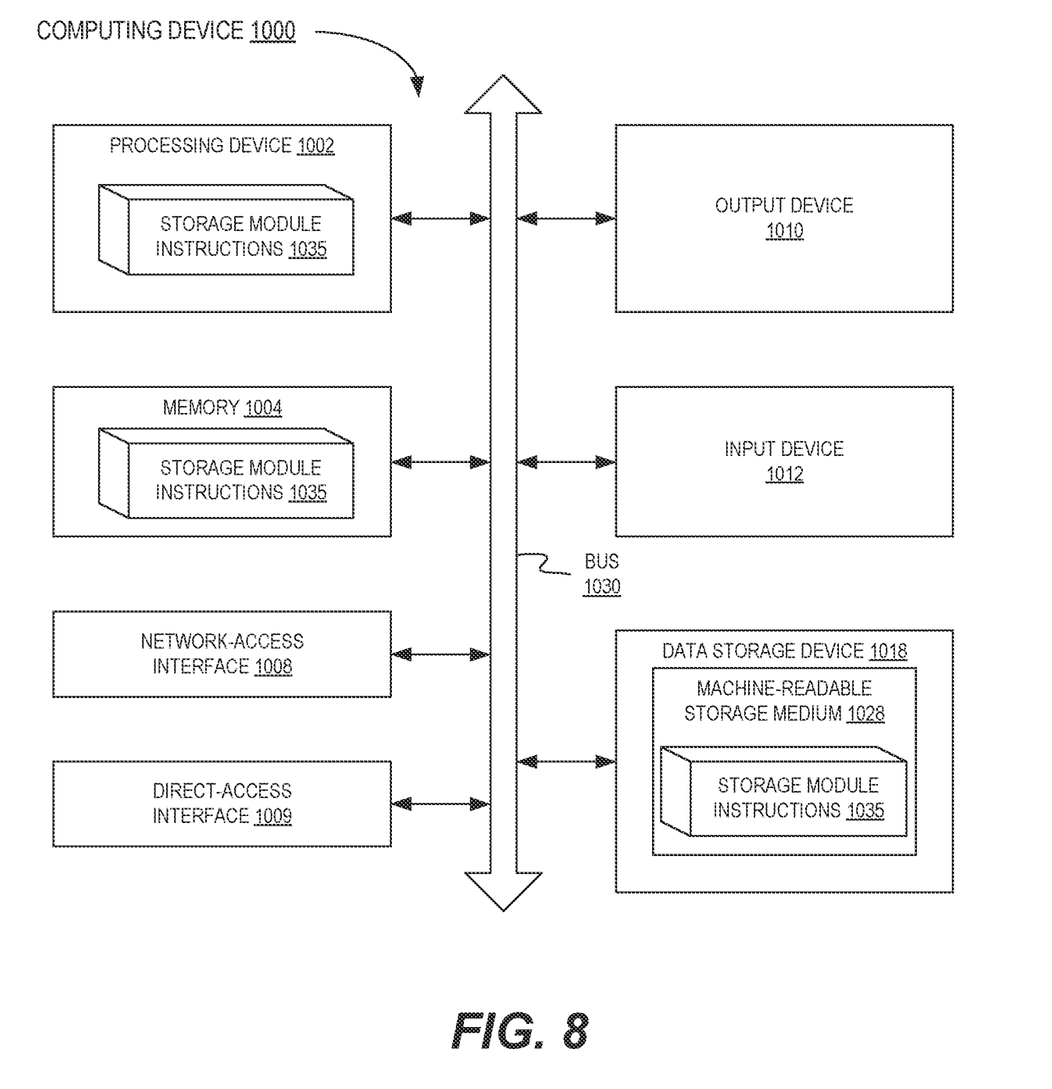
FIG. 8 is a diagram of a computing device, in accordance with one or more embodiments.

FIG. 8 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device (e.g., a processor, a controller, a central processing unit (CPU), etc.) 1002, a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network (e.g., network 120 illustrated in FIG. 1). The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
a non-volatile memory;
a buffer; and
one or more processors, individually or in combination, configured to:
receive one or more actual requests for data from one or more hosts, wherein an actual request is associated with data confirmed to be required by an application on a host;
receive one or more speculative requests for data from the one or more hosts, wherein a speculative request is associated with data that has not been confirmed to be required by an application on a host;
process the one or more actual requests prior to the one or more speculative requests;
in response to determining that resources are available after processing the one or more actual requests, perform preprocessing for the one or more speculative requests, wherein the performing preprocessing for the one or more speculative requests comprises:
performing prefetching for data associated with a first speculative request from the non-volatile memory; and
loading the prefetched data into the buffer;
receive a notification from a host associated with the first speculative request that the first speculative request has been confirmed by a corresponding application; and
send the prefetched data in the buffer to the host associated with the first speculative request.

2. The data storage device of claim 1, wherein the one or more processors, individually or in combination, are further configured to, in response to determining that resources are available after the performing preprocessing for the one or more speculative requests, perform one or more data storage device speculative techniques.

3. The data storage device of claim 2, wherein the one or more data storage device speculative techniques include one or more of: read look ahead (RLA) or machine learning.

4. The data storage device of claim 2, wherein the one or more processors, individually or in combination, are further configured to rank the one or more actual requests, the one or more speculative requests, and the one or more data storage device speculative techniques based on a type of request.

5. The data storage device of claim 1, wherein the performing preprocessing for the one or more speculative requests further comprises:
obtaining a logical-to-physical (L2P) table or page relating to logical addresses for the data associated with the first speculative request; and
converting the logical addresses to physical addresses based on the L2P table or page.

6. The data storage device of claim 1, wherein the one or more processors, individually or in combination, are further configured to convert the first speculative request to an actual request in response to the first speculative request being confirmed by the corresponding application.

7. The data storage device of claim 1, wherein the one or more processors, individually or in combination, are further configured to:
receive a notification from the host associated with the first speculative request that the first speculative request has been canceled by the corresponding application; and
thrash the prefetched data in the buffer.

8. The data storage device of claim 1, wherein the one or more processors, individually or in combination, are further configured to:
determine that the first speculative request has not been confirmed by the corresponding application within a specified period of time; and
thrash the prefetched data in the buffer.

9. The data storage device of claim 1, wherein the one or more processors, individually or in combination, are further configured to receive a plurality of speculative requests from an application on a host that are associated with logical data that is not sequential to each other.

10. The data storage device of claim 1, wherein the one or more processors, individually or in combination, are further configured to store the one or more actual requests and the one or more speculative requests in separate queues.

11. The data storage device of claim 1, wherein the one or more processors, individually or in combination, are further configured to store the one or more actual requests and the one or more speculative requests in the same queue, and each request is configured to include a flag or metadata indicating whether the request is an actual request or a speculative request.

12. A computing device comprising:
a memory; and
one or more processors, individually or in combination, configured to:
receive one or more actual requests for data on a data storage device from one or more applications, wherein an actual request is associated with data confirmed to be required by an application;
receive one or more speculative requests for data on the data storage device from the one or more applications, wherein a speculative request is associated with data that has not been confirmed to be required by an application, wherein a plurality of speculative requests from an application on a host are configured to be associated with logical data that is not sequential to each other;
send the one or more actual requests to the data storage device;
send the one or more speculative requests to the data storage device; and
in response to determining that a speculative request has been confirmed by an application, send a notification to the data storage device.

13. The computing device of claim 12, wherein the one or more processors, individually or in combination, are further configured to, in response to determining that a speculative request has been canceled by an application, send a notification to the data storage device.

14. The computing device of claim 12, wherein the computing device includes a driver configured to interface with the one or more applications and to consolidate the one or more actual requests and the one or more speculative requests.

15. A data storage device comprising:
a non-volatile memory;
a buffer; and
controller means configured to:
- receive one or more actual requests for data from one or more hosts, wherein an actual request is associated with data confirmed to be required by an application on a host;
- receive one or more speculative requests for data from the one or more hosts, wherein a speculative request is associated with data that has not been confirmed to be required by an application on a host;
- process the one or more actual requests prior to the one or more speculative requests;
- in response to determining that resources are available after processing the one or more actual requests, perform preprocessing for the one or more speculative requests, wherein the performing preprocessing for the one or more speculative requests comprises:
  - performing prefetching for data associated with a first speculative request from the non-volatile memory; and
  - loading the prefetched data into the buffer;
- receive a notification from a host associated with the first speculative request that the first speculative request has been confirmed by a corresponding application; and
- send the prefetched data in the buffer to the host associated with the first speculative request.

16. The data storage device of claim 15, wherein the controller means is further configured to:
- receive a notification from the host associated with the first speculative request that the first speculative request has been canceled by the corresponding application; and
- thrash the prefetched data in the buffer.

17. The data storage device of claim 15, wherein the performing preprocessing for the one or more speculative requests further comprises:
- obtaining a logical-to-physical (L2P) table or page relating to logical addresses for the data associated with the first speculative request; and
- converting the logical addresses to physical addresses based on the L2P table or page.

18. The data storage device of claim 15, wherein the controller means is further configured to convert the first speculative request to an actual request in response to the first speculative request being confirmed by the corresponding application.

19. The data storage device of claim 15, wherein the controller means is further configured to:
- determine that the first speculative request has not been confirmed by the corresponding application within a specified period of time; and
- thrash the prefetched data in the buffer.

20. The data storage device of claim 15, wherein the controller means is further configured to receive a plurality of speculative requests from an application on a host that are associated with logical data that is not sequential to each other.

* * * * *